United States Patent
Kruger et al.

(10) Patent No.: US 10,946,690 B1
(45) Date of Patent: Mar. 16, 2021

(54) SECUREMENT DEVICE FOR ATTACHING A MARKING IMPLEMENT TO A USER'S FINGER

(71) Applicants: Bernard Michael Kruger, West Caldwell, NJ (US); Paulo Valerio, Rockaway, NJ (US); Wade Hartman, Montvale, NJ (US)

(72) Inventors: Bernard Michael Kruger, West Caldwell, NJ (US); Paulo Valerio, Rockaway, NJ (US); Wade Hartman, Montvale, NJ (US)

( * ) Notice: Subject to any disclaimer, the term of this patent is extended or adjusted under 35 U.S.C. 154(b) by 68 days.

(21) Appl. No.: 16/556,997

(22) Filed: Aug. 30, 2019

(51) Int. Cl.
  *B43K 23/012* (2006.01)
  *A46B 5/02* (2006.01)
  *F16B 1/00* (2006.01)

(52) U.S. Cl.
  CPC ............. *B43K 23/012* (2013.01); *F16B 1/00* (2013.01); *A46B 5/02* (2013.01); *F16B 2001/0028* (2013.01)

(58) Field of Classification Search
  CPC ......... B43K 23/012; B43L 15/00; F16B 1/00; A46B 5/02; A47G 21/08
  USPC .............. 294/25; 401/7, 8; 15/443; 224/217, 224/218, 901.4; D19/135, 180
  See application file for complete search history.

(56) References Cited

U.S. PATENT DOCUMENTS

| | | | |
|---|---|---|---|
| 36,652 A | 10/1862 | Jacobs | |
| 503,011 A * | 8/1893 | Stathem | |
| 858,511 A * | 7/1907 | Guilford | |
| 1,094,888 A * | 4/1914 | Ehrle | B43K 23/012 401/8 |
| 1,206,976 A | 12/1916 | Barth et al. | |
| 1,478,170 A | 12/1923 | Blaskie et al. | |
| 1,544,971 A * | 7/1925 | Gadomski | B43K 23/012 401/8 |
| 1,652,072 A | 12/1927 | Vanek et al. | |
| 1,763,327 A | 6/1930 | Peter et al. | |
| 1,879,489 A | 9/1932 | Ray et al. | |
| 2,202,957 A * | 6/1940 | Martin | B43L 15/00 401/8 |
| 3,666,372 A | 5/1972 | Lipkowski et al. | |
| 4,148,424 A * | 4/1979 | Fortenberry | B43K 23/001 15/443 |
| D342,969 S * | 1/1994 | Edwards | D19/81 |
| 5,405,206 A * | 4/1995 | Bedol | B43K 23/012 401/202 |
| 5,722,575 A | 3/1998 | Smith | |

(Continued)

*Primary Examiner* — Paul T Chin
(74) *Attorney, Agent, or Firm* — Dunlap Bennett & Ludwig, PLLC; Brendan E. Squire

(57) ABSTRACT

An apparatus to secure a marking implement to a user's digit, includes a mounting body with a first arcuate channel extending along a longitudinal length of the mounting body. The first arcuate channel is dimensioned to receive the digit of the user. A second arcuate channel extends along the longitudinal length of the mounting body and is dimensioned to receive a shaft of the marking implement. A free end first strap is threadingly received through the mounting body to form a finger loop to secure the user's digit within the first arcuate channel. A free end of a second strap is threadingly received through the mounting body to form an implement loop to secure the marking implement in the second arcuate channel.

14 Claims, 3 Drawing Sheets

(56) References Cited

U.S. PATENT DOCUMENTS

| | | | |
|---|---|---|---|
| 5,868,509 A * | 2/1999 | Crutcher | B43K 23/012 |
| | | | 401/7 |
| 6,669,388 B1 * | 12/2003 | Short | B43K 23/012 |
| | | | 401/7 |
| 6,905,271 B1 | 6/2005 | Short | |
| 7,722,271 B1 * | 5/2010 | Harvin | B43K 8/04 |
| | | | 401/8 |
| 9,493,027 B2 | 11/2016 | Sutton | |
| 2001/0053306 A1 * | 12/2001 | Schneider | B43K 23/012 |
| | | | 401/8 |
| 2011/0305496 A1 * | 12/2011 | Jolani | B43L 15/00 |
| | | | 401/6 |
| 2017/0267015 A1 * | 9/2017 | Daniels, Jr. | B43K 27/00 |
| 2020/0290193 A1 * | 9/2020 | Soderstrom | B26B 27/007 |

\* cited by examiner

US 10,946,690 B1

SECUREMENT DEVICE FOR ATTACHING A MARKING IMPLEMENT TO A USER'S FINGER

BACKGROUND OF THE INVENTION

The present invention relates to marking implements, such as pens, pencils, paint brushes, and the like and, more particularly, to apparatus for securing the same to the fingers of a user.

While other devices exist for mounting a marking implement to a user's digit, they tend to be made of a rigid construction that is not readily adaptable to the user's digits, or to different digits of the user's hand.

Likewise, other devices exist that secure the marking implement to the user's digit with a strap, however, the user must still grasp the marking implement when applying a marking media to a substrate. In those embodiments where the user does not need to grasp the marking implement, the receiver for the marking implement is of a fixed size and therefore, is not adaptable to a variety of marking implements.

As can be seen, there is a need for an improved apparatus for securing a marking implement to a user's finger.

SUMMARY OF THE INVENTION

In one aspect of the present invention, an apparatus to secure a marking implement to a digit of a user is disclosed. The apparatus includes a mounting body having a first arcuate channel extends along a longitudinal length of the mounting body. The first arcuate channel is dimensioned to receive the digit of the user. A second arcuate channel extends along the longitudinal length of the mounting body. The second arcuate channel is dimensioned to receive a shaft of the marking implement. A first strap is configured to secure the digit within the first arcuate channel of the mounting body. A second strap is configured to secure the marking implement in the second arcuate channel of the mounting body.

In some embodiments, a stop is defined at a fixed end of each of the first strap and the second strap.

In some embodiments, a hook and a pile material are applied on at least a first surface of each of the first strap and the second strap. One of the hook and the pile material extends from the fixed end to a median portion of the first strap and the second strap. A free end of the respective strap has the other of the hook and the pile material.

In some embodiments, the first strap is threadingly received through a first strap slot extending through opposed arms of the first arcuate channel. Likewise, the second strap is threadingly received through a second strap slot extending through opposed arms of the second arcuate channel.

Preferably, a finger loop is formed within the first arcuate channel by threading of the first strap through the first strap slot. Similarly, an implement loop is formed within the second arcuate channel by the threading of the second strap through the second strap slot.

In other embodiments, the free end of the first strap is secured to the finger loop by cooperative engagement of the hook and the pile material. Likewise, the free end of the second strap is secured to the implement loop by cooperative engagement of the hook and the pile material.

In other aspects of the invention, a method of securing a marking implement to a user's digit is disclosed. The method includes providing a mounting body having a first arcuate channel extending along a longitudinal length of the mounting body. A first strap slot extends through opposed arms of the first arcuate channel. The first arcuate channel is dimensioned to receive the digit of the user. A second arcuate channel extending along the longitudinal length of the mounting body. A second strap slot extending through opposed arms of the second arcuate channel. The second arcuate channel is dimensioned to receive a shaft of the marking implement.

In other embodiments, the method also includes threading a free end of a first strap through the first strap slot and forming a finger loop within the first arcuate channel. The method may also include, threading a free end of a second strap through the second strap slot and forming an implement loop within the second arcuate channel.

In other embodiments, the user's digit is received within the finger loop, the first strap is cinched about the user's digit, and the free end of the first strap is secured to the finger loop.

In yet other embodiments of the method, the marking implement is received within the implement loop, the second strap is cinched about the marking implement, and the free end of the second strap is secured to the implement loop.

These and other features, aspects and advantages of the present invention will become better understood with reference to the following drawings, description and claims.

DETAILED DESCRIPTION OF THE INVENTION

Figure 1:
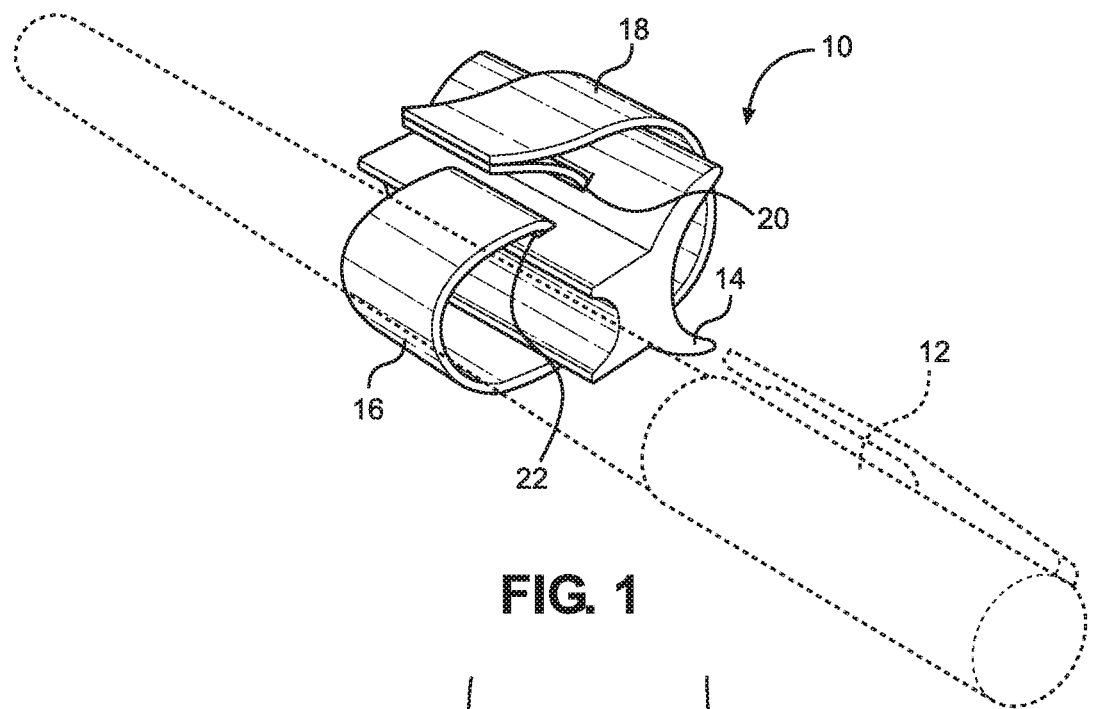
FIG. 1 is a perspective view of the marking implement securement device.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide an improved apparatus and method for securing a marking implement, such as a pen, a pencil, a paint brush, a marker, and the like, to a desired fingers or digit of a user's hand, or foot. The present invention allows for the secure attachment of writing or drawing implements to each finger allowing for unlimited artistic creation. Through the use of a specially designed body and Velcro attachment straps the system allows for multi adjustable attachment to a variety of finger sizes and marking implements.

As seen in reference to the drawings of FIGS. 1-7 a securement device 10 for attaching a marking implement 12 to a user's digit 24, such as a finger or toe, is shown. The securement device 10 includes a mounting body 14 that has a first arcuate channel 32 extending along a longitudinal length of the mounting body 14. The mounting body 14 may be formed of any suitable material and may be formed as a rigid, semi-rigid, or even a resilient material to provide cushioning of the mounting body 14 against the wearer's digit 24.

The first arcuate channel 32 is dimensioned to receive a digit 24 of the user. A second arcuate channel 34 extends along the longitudinal length of the mounting body 14. The second arcuate channel 34 is dimensioned to receive a shaft of the marking implement 12. Preferably, the first arcuate channel 32 and the second arcuate channel 34 are defined with a concavity extending into the body 14.

A first strap 16 is provided to secure the body 15 to the user's digit. The first strap 16 is threadingly received through a first strap slot 20 extending through opposed arms of the first arcuate channel 32. The first strap 16 has a stop 30 at a fixed end of the first strap 16, where the stop 30 in held in abutment with the mounting body 14. A free end of the first strap 16 is threaded through the first strap slot 20 to define a finger loop 36 within the first arcuate channel 32. The first strap 16 is wrapped over the finger loop 36 so that it may be retained by a cooperating hook 28 and pile 26 material disposed on at least a first surface of the first strap 16.

A second strap 18 is provided to secure the marking implement 12 to the mounting body 14. The second strap 18 is threadingly received through a second strap slot 22 extending transversely through opposed arms of the second arcuate channel 34. The second strap 18 has a stop 30 at a fixed end of the second strap 18 that is held in abutment with the mounting body to secure the fixed end of the second strap to the mounting body 14. A free end of the second strap 18 is threaded through the second strap slot 22 to define an implement loop 38 within the second arcuate channel 34. The second strap 18 is wrapped over the implement loop 38 so that the free end of the second strap may be retained by a cooperating hook 28 and pile 26 material disposed on at least a first surface of the second strap 18.

Figure 5:
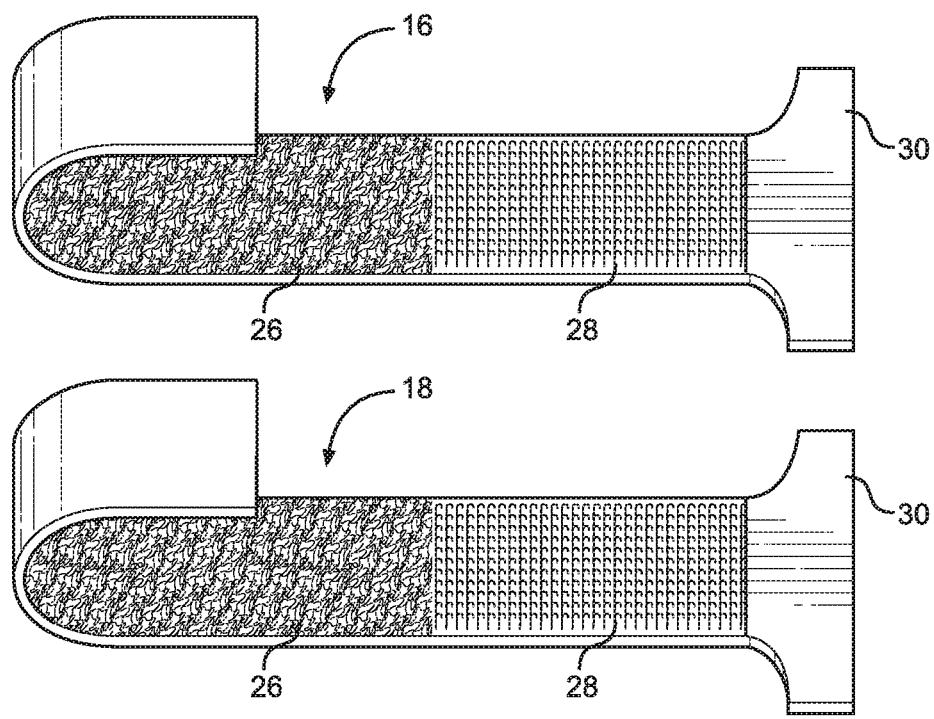
FIG. 5 is a view of the first and second straps.
Figure 6:
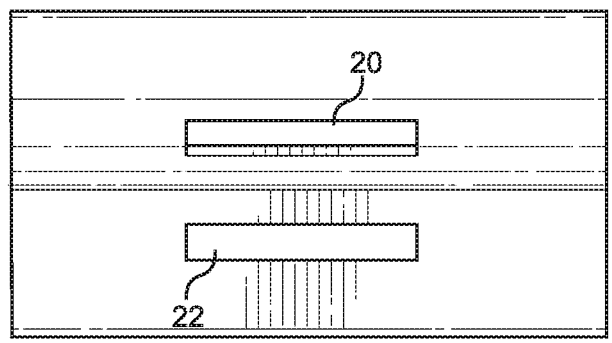
FIG. 6 is a strapless side view of the marking implement securement device body.
Figure 7:
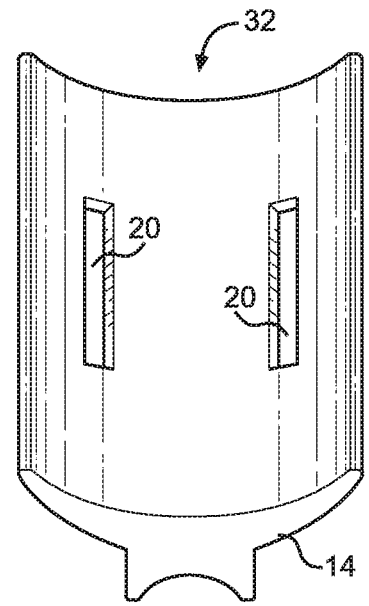
FIG. 7 is a top perspective view of a strapless marking implement securement device body.

In the non-limiting embodiment shown in reference to FIG. 5, each of the first strap 16 and the second strap 18 have segments of the cooperating hook 28 and pile 26 material on at least a first surface of the strap. One of the hook 28 and pile 25 material extends from the fixed end corresponding to the stop 30 of the respective strap to a median portion of the strap, while a remainder of the respective strap 16, 18 has the cooperating hook 28 and pile 26 material extending from the median portion of the strap to the free end of the strap. This arrangement permits each of the first strap 16 and the second strap 18 to have a slender profile and facilitates securement of the straps about their associated digit 24 or marking implement 12. Rather than distinct hook 28 or pile 26 regions, the surface of the strap 16, 18 may also be formed with the hooks 28 interspersed within the pile 26 material.

In use, each of the first strap 16 and the second strap 18 are threaded through their respective first slot 20 and second slot 22. The free end of the strap is inserted through the corresponding slot to an interior of the channel 32, 34 until the stop 30 is in abutment with an outer sidewall of the body 14. The free end is then inserted through the opposite slot 20, 22 forming the finger loop 36 and implement loop 38. With the digit 24 or implement 12 received within the channel 32, 34, the free end of the strap 16, 18 is drawn to constrict the finger loop 36 or the implement loop 38 about the implement 12 or digit 24 carried within the loop 36, 38. The free end of the strap 16, 18 is then applied to the loop 36, 38 to secure the implement 12 and the digit 24 within the loop 36, 38 by the cooperative engagement of the hook 28 and pile 26 material.

Figure 2:
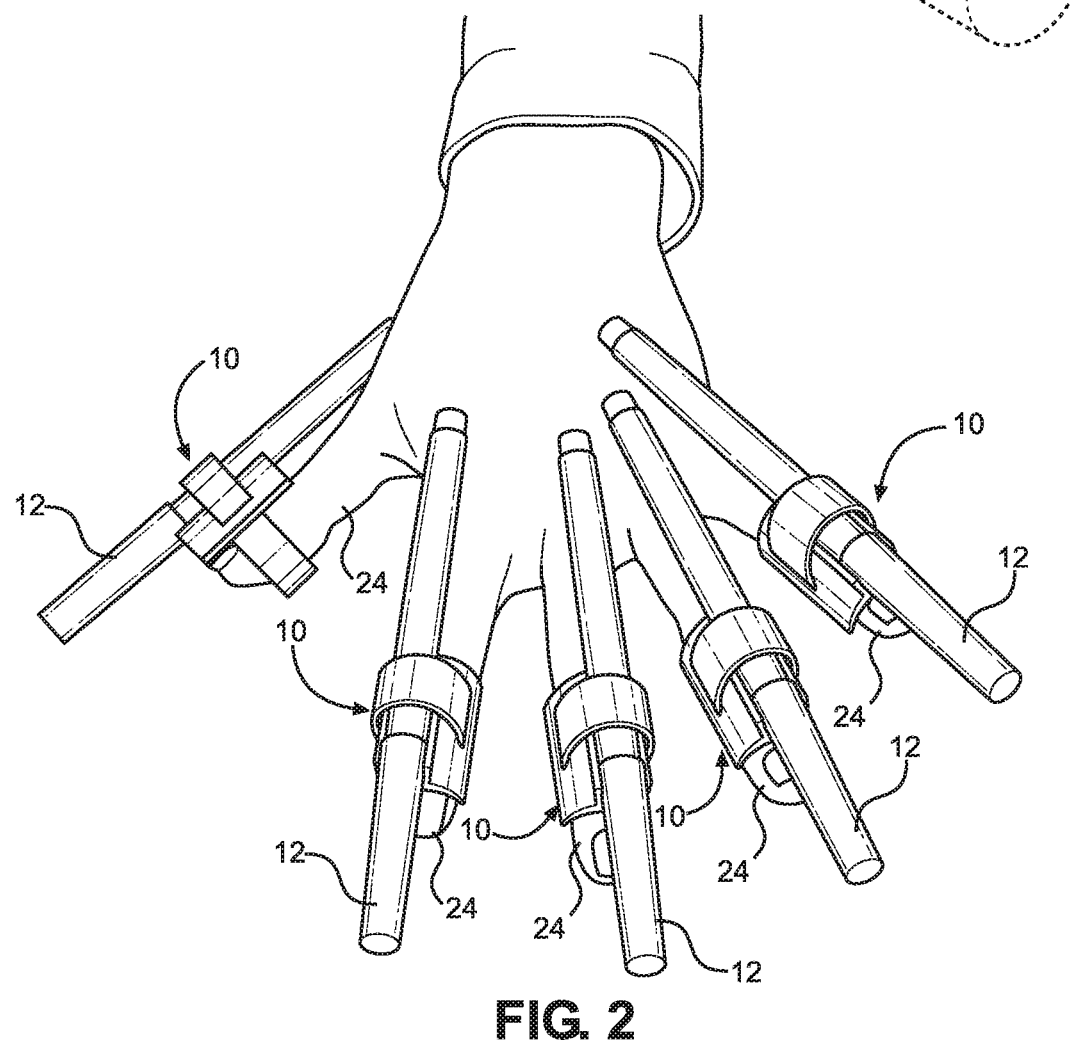
FIG. 2 is a view of multiple marking implement securement devices on one hand.
Figure 3:
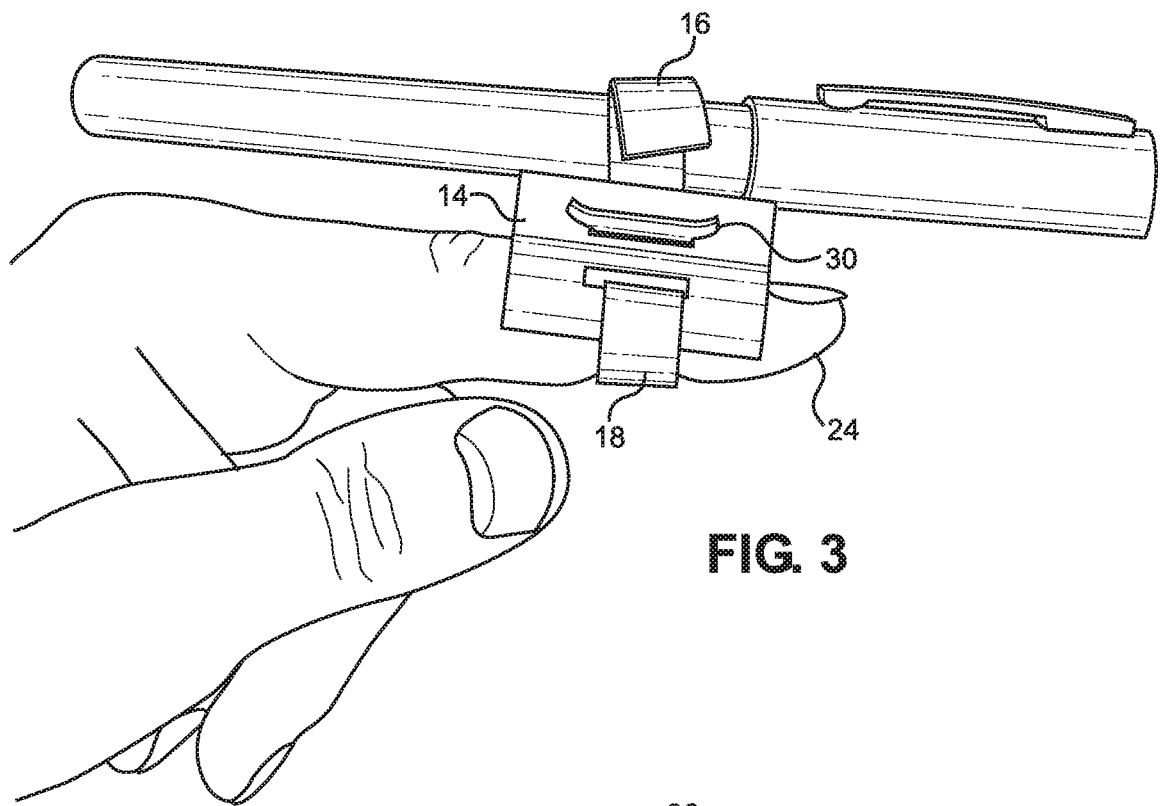
FIG. 3 is a side view of the marking implement securement device secured to a finger.
Figure 4:
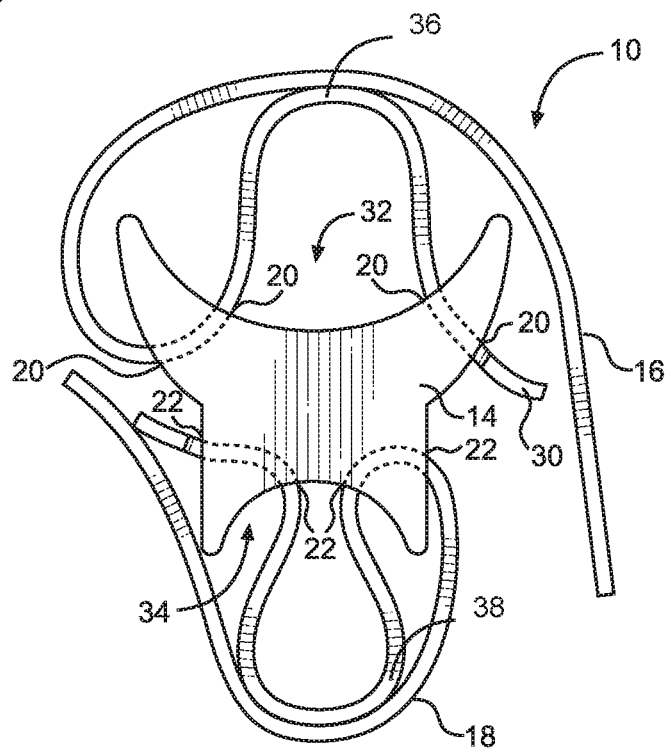
FIG. 4 is a front view of the assembled marking implement securement device showing the strap configuration.

As seen in reference to FIG. 2, the securement device 10 of the present invention may be utilized on a single digit 24 or a plurality of digits 24. In the application shown, the securement device 10 is used to attach a marking implement 12 to each digit 24 of a user's hand. Each marking implement 12 may have the same or a different marking device 12. Likewise, each marking implement 12 may carry the same or a different marking media. The marking media may include ink; a paint; a crayon, a charcoal; or any suitable marking media. The various artistic media can then be applied and the drawings or paintings can be done using as many digits as desired.

It should be understood, of course, that the foregoing relates to exemplary embodiments of the invention and that modifications may be made without departing from the spirit and scope of the invention as set forth in the following claims.

What is claimed is:

1. An apparatus to secure a marking implement to a digit of a user, comprising:
 a mounting body having a first arcuate channel extending along a longitudinal length of the mounting body, with the first arcuate channel dimensioned to receive the digit of the user, a second arcuate channel extending along the longitudinal length of the mounting body, with the second arcuate channel dimensioned to receive a shaft of the marking implement;
 a first strap configured to secure the digit within the first arcuate channel of the mounting body; and
 a second strap to secure the marking implement in the second arcuate channel of the mounting body.

2. The apparatus of claim 1, further comprising:
 a stop defined at a fixed end of each of the first strap and the second strap.

3. The apparatus of claim 2, further comprising:
 a hook and a pile material applied on at least a first surface of each of the first strap and the second strap, wherein one of the hook and the pile material extends from the fixed end to a median portion of the first strap and the second strap, while a free end of the respective strap has the other of the hook and the pile material.

4. The apparatus of claim 3, wherein the first strap is threadingly received through a first strap slot extending through opposed arms of the first arcuate channel.

5. The apparatus of claim 4, further comprising:
 a finger loop formed within the first arcuate channel by threading of the first strap through the first strap slot.

6. The apparatus of claim 5, wherein the free end of the first strap is secured to the finger loop by cooperative engagement of the hook and the pile material.

7. The apparatus of claim 3, wherein the second strap is threadingly received through a second strap slot extending through opposed arms of the second arcuate channel.

8. The apparatus of claim 7, further comprising:
 an implement loop formed within the second arcuate channel by the threading of the second strap through the second strap slot.

9. The apparatus of claim 8, wherein the free end of the second strap is secured to the implement loop by cooperative engagement of the hook and the pile material.

10. A method of securing a marking implement to a user's digit, comprising:
 providing a mounting body having a first arcuate channel extending along a longitudinal length of the mounting body, a first strap slot extending through opposed arms of the first arcuate channel, the first arcuate channel dimensioned to receive the digit of the user, a second arcuate channel extending along the longitudinal length of the mounting body, a second strap slot extending through opposed arms of the second arcuate channel, the second arcuate channel dimensioned to receive a shaft of the marking implement.

11. The method of claim 10, further comprising:
threading a free end of a first strap through the first strap slot and forming a finger loop within the first arcuate channel.

12. The method of claim 11, further comprising:
receiving a user's digit within the finger loop;
cinching the first strap about the user's digit; and
securing the free end of the first strap to the finger loop.

13. The method of claim 10, further comprising:
threading a free end of a second strap through the second strap slot and forming an implement loop within the second arcuate channel.

14. The method of claim 13, further comprising:
receiving the marking implement within the implement loop;
cinching the second strap about the marking implement; and
securing the free end of the second strap to the implement loop.

* * * * *